United States Patent

[11] 3,614,205

| [72] | Inventors | Wesley H. Whitman, Jr. <br> La Sierra; <br> Richard D. Anderson, Riverside, both of Calif. |
|---|---|---|
| [21] | Appl. No. | 443,110 |
| [22] | Filed | Mar. 26, 1965 |
| [45] | Patented | Oct. 19, 1971 |
| [73] | Assignee | The United States of America as represented by the Secretary of the Navy |

[54] TWO-CHANNEL OPTICAL TRANSMITTER
3 Claims, 2 Drawing Figs.

[52] U.S. Cl. .................................................. 350/171, 350/96 R
[51] Int. Cl. .................................................. G02b 27/14
[50] Field of Search .................................................. 350/96, 169, 170, 171, 174; 88/1 MI, 1 R

[56] References Cited
UNITED STATES PATENTS
3,328,589  6/1967  Ferguson ..................... 350/169 X

*Primary Examiner*—Rodney D. Bennett, Jr.
*Assistant Examiner*—Daniel O. Kaufman
*Attorneys*—J. M. St. Amand and G. J. Rubens ABSTRACT: An optical prism system for obtaining two separate light beams by collimating light from a single source, and projecting it through a beam forming and folding light guide prism which forms the light into two separate fields of view.

WESLEY H. WHITMAN JR.
RICHARD D. ANDERSON
INVENTORS

BY J. M. St. Amand

ATTORNEY

TWO-CHANNEL OPTICAL TRANSMITTER

The present invention relates to optical apparatus and more particularly to an optical prism system for obtaining two separate light beams from a single source.

The instant prism system takes light from a single source, collimates it, and projects it through a common aperture into two separate fields of view or beams; each beam being a 90° sector of a thin wall cone, and the two cones having different apex angles. Each prism is a light guide which is a beam-forming as well as a beam-folding device and uses the refraction properties of the optical medium to obtain required angles. Since this prism system is not an image-forming device, it requires no optical corrections for any aberrations or for any nonuniform distortion caused by the beam-forming surfaces. Furthermore, the instant device requires no moving parts to view two angles simultaneously.

It is an object of the invention, therefore, to provide an optical prism system for obtaining two separate light beams from a single source.

Another object of the invention is to provide an optical system for taking light from a single source, collimating it and projecting it through a common aperture into two separate beams or fields of view.

A further object of the invention is to provide a light guide prism system for viewing two angles simultaneously without involving the use of moving parts.

Other objects and many of the attendant advantages of this invention will become readily appreciated as the same becomes better understood by reference to the following detailed description when considered in connection with the accompanying drawings wherein.

Referring now to the drawing like numerals refer to like parts in each of the figures.

Figure 1:
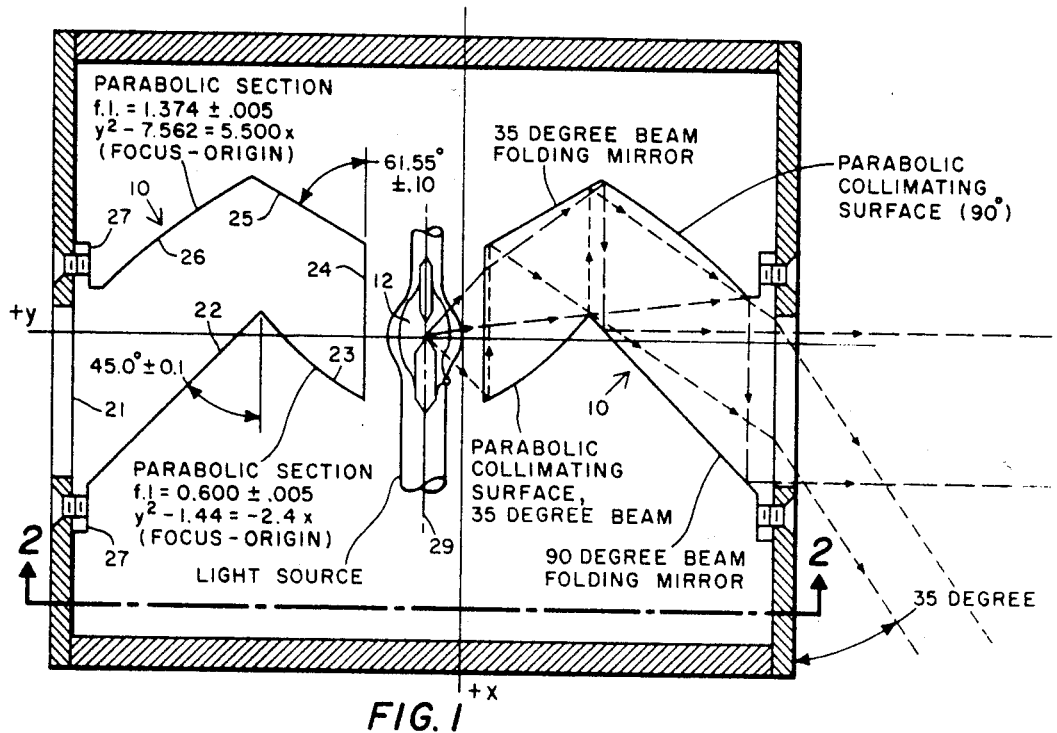
FIG. 1 is a sectional side view of a two channel optical transmitter using four optical prism systems.

In the device described herein specific dimensions are given by way of example for one particular size embodiment. The drawings show an arrangement of four light pipes or prism systems 10 together with a light source 12, which in the instant example is a flashtube, all mounted within a cylindrical housing 14 having four respective windowed apertures 16 therein.

Each light pipe or prism system 10 is of 0.80 in.-thick lucite plastic. Surfaces 21, 22, 24, 25, and 28 are flat surfaces, and surfaces 23 and 26 are parabolic collimating surfaces with focal lengths of 0.600 inch and 1.374 inches respectively. All surfaces are polished and, with the exception of surfaces 21 and 24, are aluminized for internal reflection of light. Flanges 27 are provided for the purpose of mounting the prisms to housing 14. Angles and dimensions for the specific example described herein are shown on the drawing. The prism system optics, in this instance, are made of Lucite plastic that has a refractive index of 1.5, and has two parabolic collimating surfaces 23 and 26 and two folding mirror surfaces 22 and 25.

Figure 2:
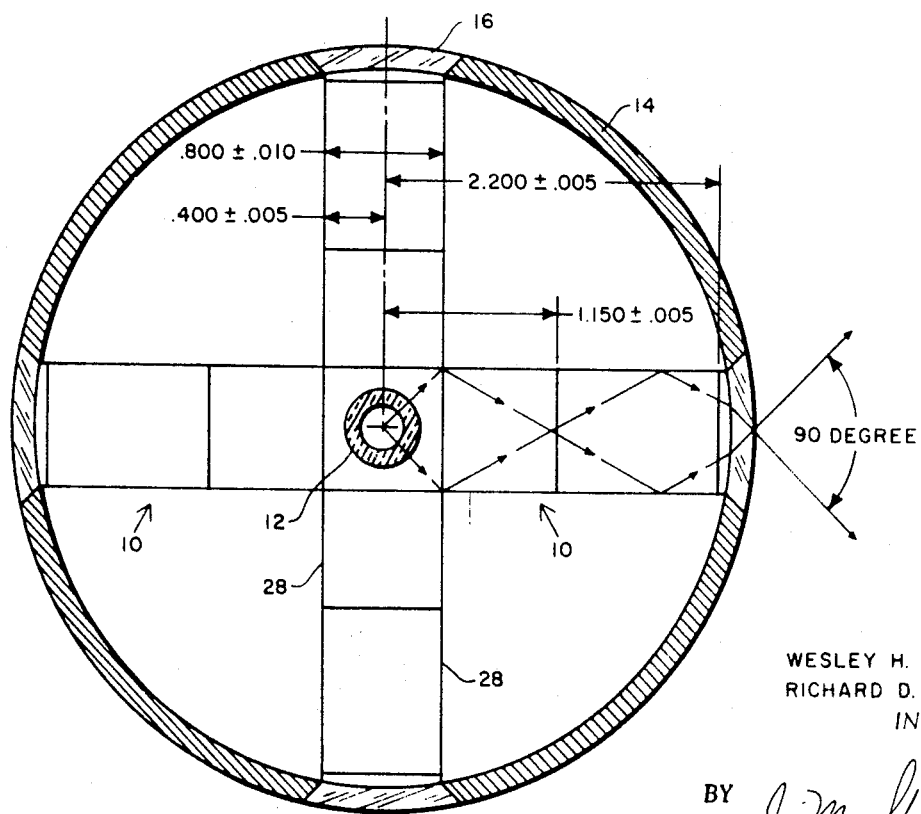
FIG. 2 is a sectional view taken along line 2—2 of FIG. 1, showing the four-prism systems for full 360° coverage.

Only the extreme rays accepted by each light pipe are shown in FIGS. 1 and 2. In a cross section each light pipe subtends an angle of 90° at the light source 12 (such as a Xenon arc flashtube for example). With a beam divergence of 90°, the four transmitter windows 16 give complete azimuthal coverage, FIG. 1 shows the method of obtaining the two-beam pattern. Of the light accepted by a light pipe 10, 52 percent is collected and collimated by the nearer parabolic surface 23 (0.6-in. focal length). After reflection at the 35° beam-folding mirror 25, the beam is refracted at the window surface 21 of the light pipe at an angle of 35° to the central axis 29. The larger parabolic surface 26 (1.374-in. focal length) collects and collimates approximately 32 percent of the incident light, which after reflection at folding mirror 22, forms the 90° beam. Thus, about 84 percent of the radiated energy is put to use in such a manner that the forward-looking channel (at 35° angle to central axis) has 1.6 times as much energy as the 90° channel beam. Other than the limited size of the arc, the beam width will be determined by the larger virtual arc seen by the parabolic surfaces, which is caused by the refraction of the light on entering the light pipe at surface 24.

A light pipe or prism system 10 can be constructed of any material (glass, plastic, quartz, etc.) transparent to the wavelength of radiant energy to be transmitted. For different materials, there will be necessary variations in the angles from the horizontal for the plane-folding mirror surfaces and slight changes in the parabolic beam-forming surfaces in order to compensate for different indices of refraction. Also, these angles and parabolic surfaces may be changed to give different beam elevation angles. Cylindrical section surfaces may be substituted for the parabolic surfaces. Mounting of light source can be accomplished by several methods. The flat side surfaces 28 of the prism system may not XX be required to be mirrored depending upon the refractive properties of the prism material.

Obviously many modifications and variations of the present invention are possible in the light of the above teachings. It is therefore to be understood that within the scope of the appended claims the invention may be practices otherwise than as specifically described.

What is claimed is:

1. In a two-channel optical transmitter for complete azimuthal coverage comprising a housing, a light source and a plurality of prism systems and transmitter windows, each prism system comprising:
   a. a light pipe of material transparent to the wavelength of radiant energy to be transmitted therethrough,
   b. entrance and exit surfaces to said light pipe being flat and parallel to each other,
   c. a first pair of side surfaces being flat and parallel to each other, and perpendicular to said entrance and exit surfaces,
   d. first and second parabolic collimating surfaces and first and second flat folding mirror surfaces forming the other sides of said light pipe,
   e. each of said surfaces being polished and all but said entrance and exit surfaces being mirrored,
   f. said parabolic surfaces each being on opposite sides of said light pipe and perpendicular to said first pair of parallel side surfaces,
   g. said folding mirror surfaces each being on opposite sides of said light pipe and perpendicular to said first pair of parallel side surfaces,
   h. said first parabolic surface and said first folding mirror surface each being opposite each other and adjacent said entrance surface,
   i. said second parabolic surface and said second folding mirror surface each being opposite each other and adjacent said exit surface,
   j. said first parabolic surface being adjacent said second folding mirror surface, and said first folding mirror surface being adjacent said second parabolic surface.

2. A prism system as in claim 1 wherein in cross section said light pipe subtends an angle of 90° at the light source and four such prism systems give 360° coverage.

3. A prism system as in claim 1 wherein in cross section said light pipe subtends an angle of 90° at the light source.